(12) United States Patent
Freeman et al.

(10) Patent No.: US 10,475,233 B2
(45) Date of Patent: Nov. 12, 2019

(54) SYSTEM, METHOD AND SOFTWARE FOR CONVERTING IMAGES CAPTURED BY A LIGHT FIELD CAMERA INTO THREE-DIMENSIONAL IMAGES THAT APPEAR TO EXTEND VERTICALLY ABOVE OR IN FRONT OF A DISPLAY MEDIUM

(71) Applicant: Maxx Media Group, LLC, Philadelphia, PA (US)

(72) Inventors: Richard S. Freeman, Philadelphia, PA (US); Scott A. Hollinger, Philadelphia, PA (US)

(73) Assignee: Maxx Media Group, LLC, Philadelphia, PA (US)

( * ) Notice: Subject to any disclaimer, the term of this patent is extended or adjusted under 35 U.S.C. 154(b) by 22 days.

(21) Appl. No.: 15/829,861

(22) Filed: Dec. 1, 2017

(65) Prior Publication Data

US 2018/0158229 A1    Jun. 7, 2018

Related U.S. Application Data

(63) Continuation-in-part of application No. 15/481,447, filed on Apr. 6, 2017, now Pat. No. 10,136,121.

(60) Provisional application No. 62/319,788, filed on Apr. 8, 2016.

(51) Int. Cl.
*G06T 15/08* (2011.01)
*G06F 3/14* (2006.01)
*G06T 15/00* (2011.01)
*H04N 13/122* (2018.01)

(52) U.S. Cl.
CPC ............... *G06T 15/08* (2013.01); *G06F 3/14* (2013.01); *G06T 15/005* (2013.01); *H04N 13/122* (2018.05)

(58) Field of Classification Search
CPC .............. G06T 19/006; G06T 2200/04; G06T 2207/10052; G06T 7/557; G06T 19/20
See application file for complete search history.

(56) References Cited

U.S. PATENT DOCUMENTS

| | | |
|---|---|---|
| 3,723,904 A | 3/1973 | Bernier |
| 5,790,284 A | 8/1998 | Taniguchi et al. |
| 6,121,972 A | 9/2000 | Takahashi et al. |
| 6,614,427 B1 | 9/2003 | Aubrey |
| 6,657,998 B2 | 12/2003 | Li |
| 7,364,300 B2 | 4/2008 | Favalora et al. |
| 7,589,759 B1 | 9/2009 | Freeman et al. |

(Continued)

*Primary Examiner* — Haixia Du
(74) *Attorney, Agent, or Firm* — LaMorte & Associates, P.C.

(57) ABSTRACT

System, method and software for producing imagery with enhanced 3D effects that is viewed on a display medium. The imagery contains elements that appear, at least in part to extend vertically above, or in front of the surface of the display medium. To create the imagery with enhanced 3D effects, a light field camera images a scene that contains at least one subject. At a given moment in time, the subject is positioned in an initial orientation. Upon imaging, the light field camera produces light field image data that represents the scene. The light field image data is edited to add enhanced 3D effects. Once edited, the enhanced image data is played on a display medium, where the added 3D effects cause the subject to appear, at least in part, to extend vertically above, or in front of, the display medium.

18 Claims, 11 Drawing Sheets

(56) References Cited

U.S. PATENT DOCUMENTS

| | | |
|---|---|---|
| 8,749,620 B1 | 6/2014 | Knight et al. |
| 2008/0079660 A1* | 4/2008 | Fukushima .......... H04N 13/275 345/7 |
| 2011/0063420 A1 | 3/2011 | Masuda |
| 2012/0026289 A1 | 2/2012 | Suenaga et al. |
| 2012/0242777 A1 | 9/2012 | Yu et al. |
| 2012/0263372 A1 | 10/2012 | Adachi |
| 2012/0314934 A1* | 12/2012 | Kudo .................. G06F 3/04845 382/154 |
| 2017/0294052 A1 | 10/2017 | Freeman et al. |

* cited by examiner

SYSTEM, METHOD AND SOFTWARE FOR CONVERTING IMAGES CAPTURED BY A LIGHT FIELD CAMERA INTO THREE-DIMENSIONAL IMAGES THAT APPEAR TO EXTEND VERTICALLY ABOVE OR IN FRONT OF A DISPLAY MEDIUM

RELATED APPLICATIONS

This application is a continuation-in-part of co-pending U.S. patent application Ser. No. 15/481,447, filed Apr. 6, 2017 which claims benefit of U.S. Provisional Patent Application No. 62/319,788 filed Apr. 8, 2016.

BACKGROUND OF THE INVENTION

1. Field of the Invention

In general, the present invention relates to systems, methods, and software that are used to create three-dimensional images that are viewed on a display medium, such as an electronic display or printed paper. More particularly, the present invention relates to systems, methods and software that create three-dimensional images with enhanced effects that cause the three-dimensional images to appear to extend above, or in front of, the display medium being viewed.

2. Prior Art Description

Many systems exist for creating images that appear three-dimensional when viewed on a two-dimensional electronic display. However, traditional prior art systems create three-dimensional images that appear to exist behind or below the plane of the display medium. It is far more difficult to create a three-dimensional image that will appear to stand above, or in front of, the screen on which it is viewed. To create a three-dimensional image that appears to be above or in front of a display medium, sophisticated adjustments have to be incorporated into the creation of the image. Such adjustments often include using stereoscopic cameras and creating complex adjustments to the parallax of the stereoscopic cameras used in the creation of the image. Prior art systems that modify the parallax of stereoscopic images are exemplified by U.S. Pat. No. 7,589,759 to Freeman, U.S. Patent Application Publication No. 2012/0263372 to Adachi and U.S. Patent Application No. 2011/0063420 to Masuda.

In the prior art, creating a three-dimensional image that appears to extend in front of or above a display medium is primarily accomplished by creatively altering the parallax of the imaging stereoscopic cameras as the object is imaged. Only minor adjustments are made to the virtual object being imaged prior to the imaging.

It has been discovered that three-dimensional images can be created more realistically and with more clarity by using a light field camera and manipulating the camera image data to add enhanced 3D effects. The added 3D effects cause the images to appear to extend vertically above, or in front of, a display medium. The improved technique represents an advancement in the art as described and claimed below.

SUMMARY OF THE INVENTION

The present invention is a system, method and software for producing imagery with enhanced 3D effects that is viewed on a display medium. The imagery with enhanced 3D effects can be a fixed image or a dynamic video. The imagery contains elements that appear, at least in part to extend vertically above, or in front of the display medium that is showing the imagery.

To create the imagery with enhanced 3D effects, a light field camera images a scene that contains at least one subject. At a given moment in time, the subject is positioned in an initial orientation. Upon imaging, the light field camera produces light field image data that digitally represents the scene being imaged. The light field image data may be interpreted dimensionally different ways, including converting to left and right eye stereo images, or converting to left and right eye side-by-side images.

The light field image data corresponding to the subject in the scene is edited to add enhanced 3D effects. Once edited, the light field image data becomes enhanced image data. When the enhanced image data is printed as an image or played on a display, the added 3D effects cause the subject to appear, at least in part, to extend vertically above, or in front of, the display medium depending upon the orientation of the display medium.

BRIEF DESCRIPTION OF THE DRAWINGS

For a better understanding of the present invention, reference is made to the following description of an exemplary embodiment thereof, considered in conjunction with the accompanying drawings, in which.

DETAILED DESCRIPTION OF THE DRAWINGS

Although the present invention system, method and software can be used to image most any object, the embodiment illustrated shows the present invention being used to image of a toy dinosaur. This embodiment is selected for the purposes of description and explanation only. The toy dinosaur is intended to represent any object that can be imaged and presented through the system. However, the illustrated embodiment is purely exemplary and should not be considered a limitation when interpreting the scope of the appended claims.

Figure 1:
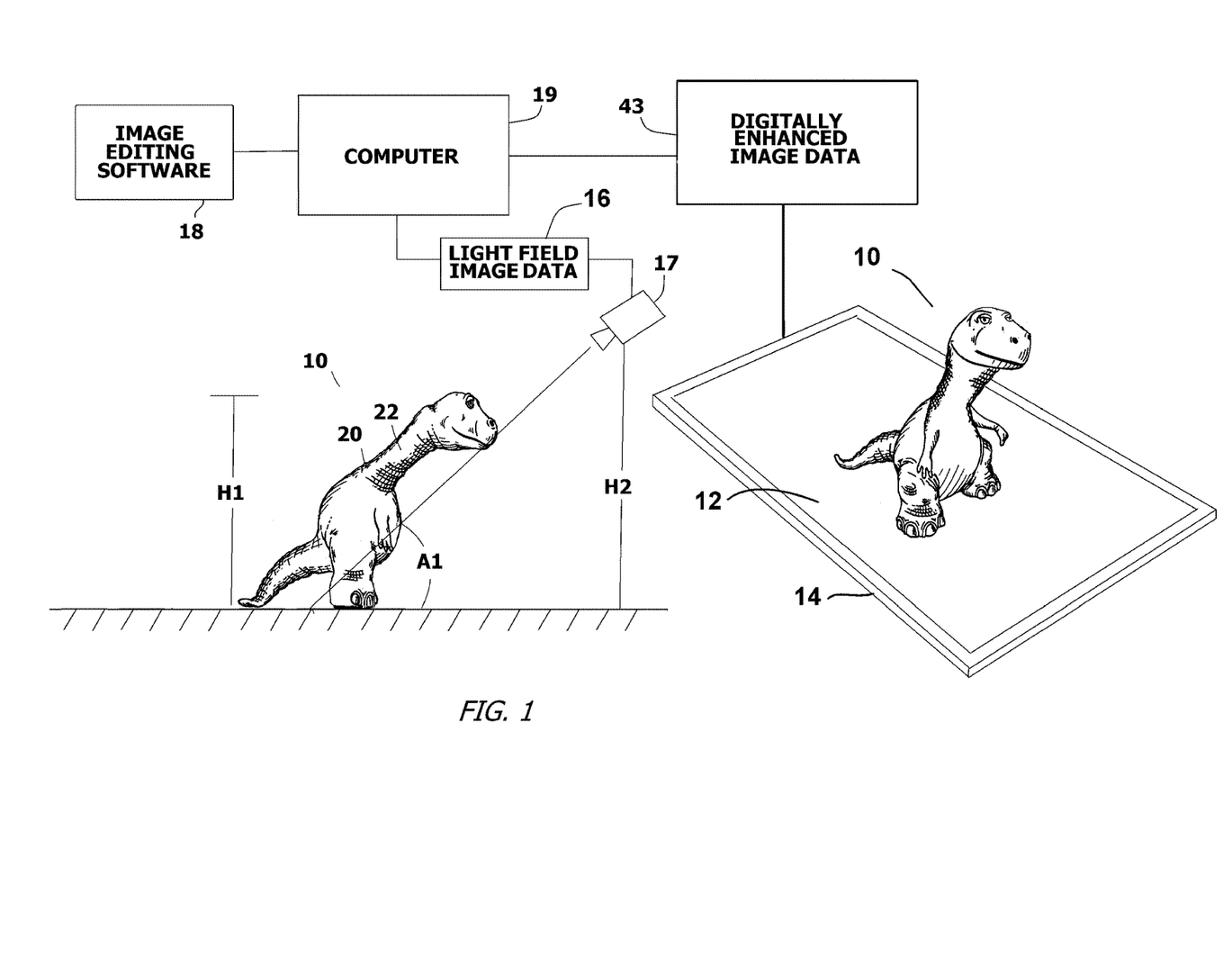
FIG. 1 shows system hardware needed to create and utilize the present invention system, method, and software.

Referring to FIG. 1, it will be understood that the present invention is used to produce imagery 10 with enhanced 3D effects that is viewed on a display medium, such as a printed page or the illustrated example of a display 12 of an electronic device 14. The imagery 10 can be a stationary image or a video. Regardless, the imagery 10 appears to have elements that are three-dimensional when viewed on the display 12. Furthermore, at least part of some of the elements embody enhanced 3D effects that cause those elements to appear to extend vertically above, or in front of, the surface plane of the display 12. If the electronic device 14 has a traditional LED or LCD display, the imagery 10 will have to be viewed with 3D glasses in order to observe the three-dimensional effects in the imagery 10. If the electronic device 14 has an autostereoscopic display, then the three-dimensional effects in the imagery 10 can be observed with the naked eye.

The imagery 10 that contains enhanced 3D effects starts as a physical scene 15 that is captured by a light field camera 17. The physical scene 15 captured by the light field camera 17 typically contains a primary subject 20. In the shown example, the primary subject 20 is a toy dinosaur 22. However, it will be understood that any subject or collection of subjects can be imaged. Upon imaging, the light field camera 17 creates light field image data 16. The light field data 16 is read by a computer 19. The computer 19 runs specialized image editing software 18 that adds enhanced 3D effects to the light field image data 16.

Figure 2:
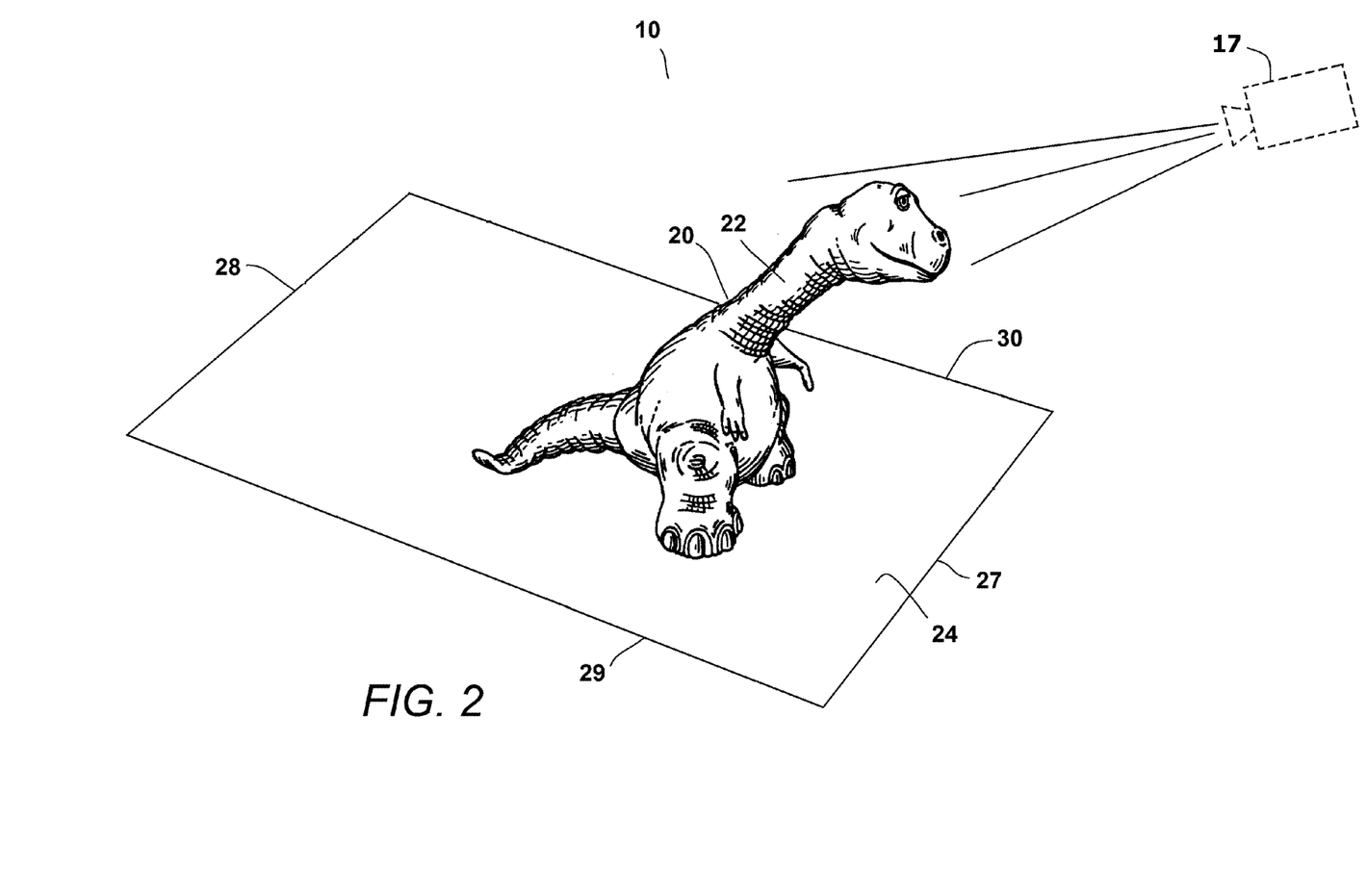
FIG. 2 is a perspective view of the scene representing the data collected by imaging a physical scene.

Referring to FIG. 2 in conjunction with FIG. 1, it will be understood that the light field image data 16 is a digital representation of the original physical scene 15. The light field image data 16 can be viewed, wherein the resulting image would appear as it does in FIG. 2. Using the image editing software 18, the light field image data 16 is viewed and a reference plane 24 is selected for the light field image data 16. The reference plane 24 can be any plane in the light field image data 16 from which objects are to appear above and/or below. In the shown embodiment, the reference plane 24 is oriented with the ground upon which the toy dinosaur 22 stands. The reference plane 24 of the light field image data 16, when displayed on an electronic display 12, is going to be oriented along the surface plane of the electronic display 12. As such, when the imagery 10 is viewed, any part of a subject imaged above the reference plane 24 will project vertically above, or in front of the display 12, depending on the orientation of the display 12. Conversely, any part of a subject imaged below the reference plane 24 will appear to be rearwardly projected and will appear below or behind the plane of the display 12, when the imagery 10 is viewed.

If the imagery 10 is to be printed, then the reference plane 24 is selected to correspond with the plane of the paper upon which the imagery 10 is printed.

The light field camera 17 is positioned at an angle in front of and above the primary subject 20 in the physical scene 15. The angle of elevation A1 of the light field camera 17 is dependent upon the height of the subjects being imaged and the degree of surrounding area desired to be captured by the light field camera 17. The field of view imaged by the light field camera 17 is limited and it is understood that the light field image data 16 is intended to be shown on an electronic display 12. Most electronic displays are rectangular, having a width that is between 50% and 80% of the length. Accordingly, the light field image data 16 is created within boundaries appropriate in size and scale for a typical electronic display 12. The boundaries include a front boundary 27, a rear boundary 28, and two side boundaries 29, 30. Any imagery 10 that is to be displayed on the electronic display 12 must exist within the boundaries 27, 28, 29, 30 in order to be seen.

A rear image boundary 28 is set for the light field image data 16. All of the subjects to appear in the final imagery 10 must be positioned forward of the rear image boundary 28. The primary subject 20 has a height H1. The light field camera 17 is set to a second height H2. The second height H2 is a function of the subject height H1 and the rear image boundary 28. The second height H2 of the light field camera 17 is high enough so that the top of the primary subject 20, as viewed from the light field camera 17 does not extend above the rear image boundary 28. Accordingly, the elevation angle of the light field camera 17 depends upon the scene boundaries 27, 28, 29, 30 and height H1 of the primary subject 20.

Figure 3:
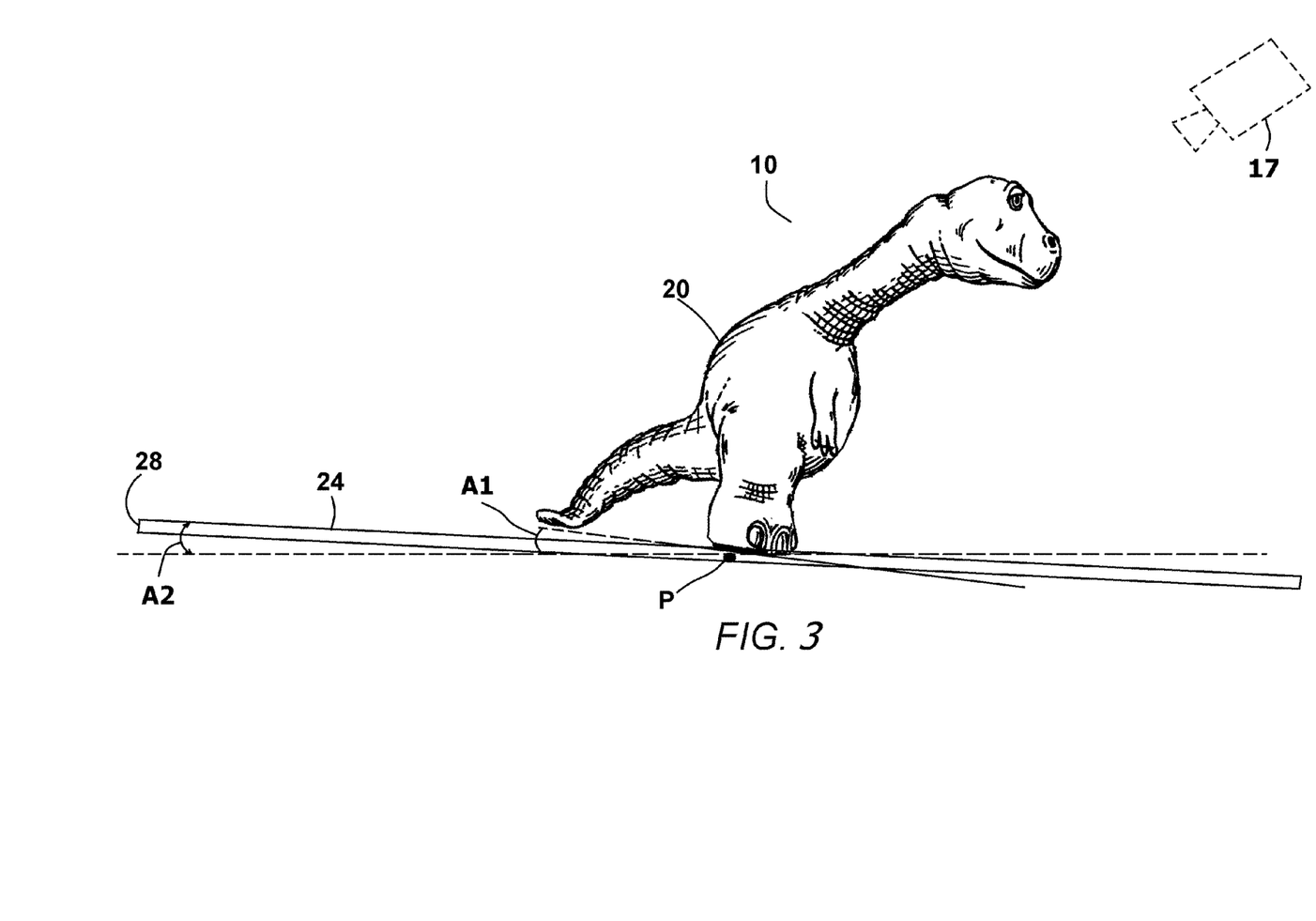
FIG. 3 is a side view showing tilt digital modifications made to the data collected by imaging.

Referring to FIG. 3 in conjunction with FIG. 2 and FIG. 1, it can be explained that the light field image data 16 from the light field camera 17 is not used directly. Rather, the light field image data 16 digitally manipulated using the custom image editing software 18 being run by the computer 19. The custom image editing software 18 is used to produce various enhance 3D effects. The digital manipulations performed by the custom image editing software 18 includes, but is not limited to:

i. tilt manipulations of the reference plane of the imaged scene;
ii. tilt manipulations of the primary and secondary subjects in the imaged scene;
iii. bend manipulations;
iv. taper manipulations;
v. stretch manipulations.

The digital manipulations that are used depend upon the details of the subjects being imaged.

FIG. 3 illustrates the possible tilt manipulations that can be used. In one tilt manipulation, the light field image data 16 that corresponds to the primary subject 20 and/or other imaged subjects can be digitally tilted toward or away from the position of the light field camera 17. Alternatively, the primary subject 20 itself can be physically tilted prior to imaging. Accordingly, one or more of the various subjects can be titled with an angle of inclination A1. The preferred tilt angle is generally between 1 degree and 20 degrees from the original orientation.

In a second tilt manipulation, the whole of the reference plane 24 can be tilted toward or away from the light field camera 17. This also can be achieved either digitally or physically. The preferred tilt angle A2 is generally between 1 degree and 20 degrees from the horizontal, depending upon the final perceived height of the primary subject 20.

Using a point P under the primary subject 20 as a fulcrum point, the reference plane 24 can be digitally and/or physically manipulated to tilt forward or backward. The tilt angle T2 of the reference plane 24 and the tilt angle T1 of the primary subject 20 are independent of one another. The tilting of the reference plane 24 changes the position of the rear image boundary 28 relative to the perceived position of the primary subject 20. This enables the height of the primary subject 20 to be increased proportionately within the confines of the mathematical relationship.

Figure 4:
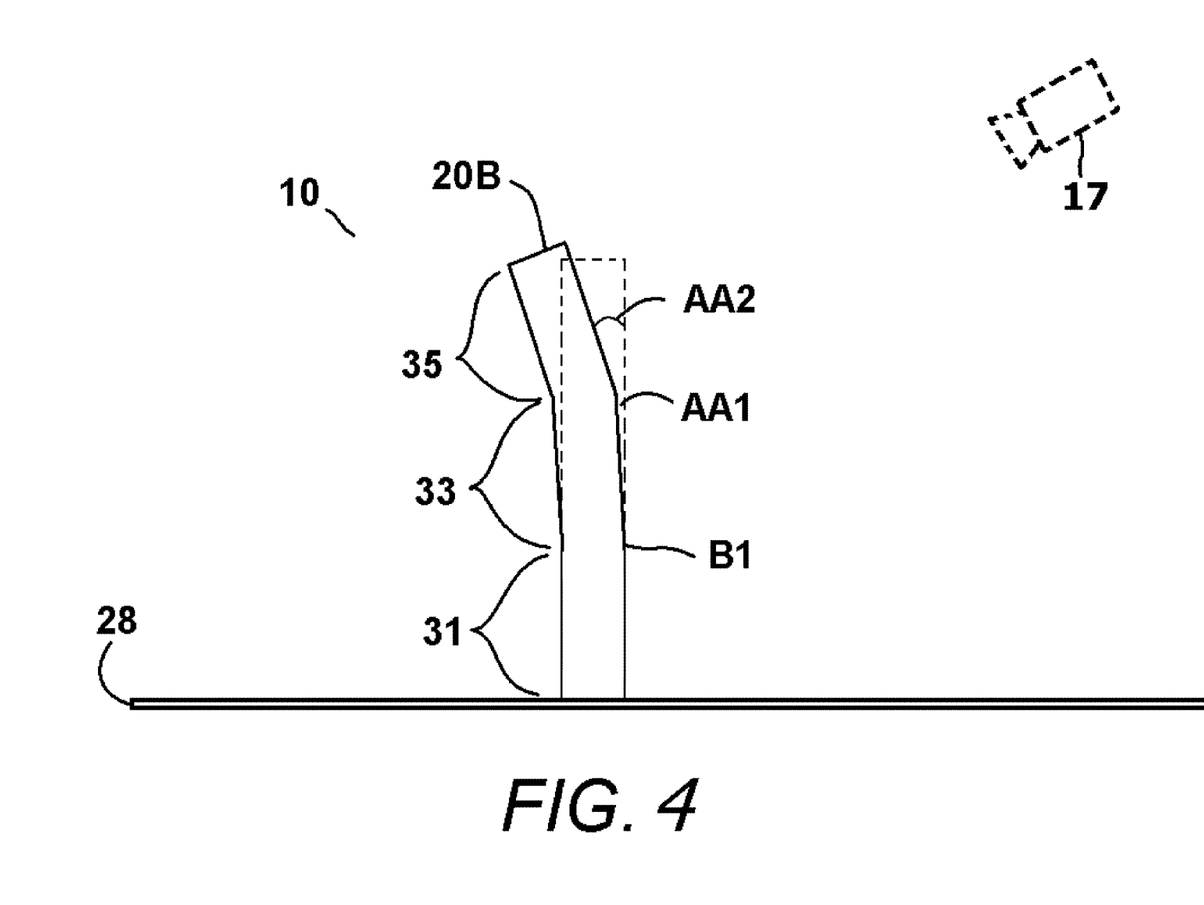
FIG. 4 is a side view showing bend digital modifications made to the data collected by imaging.

Referring to FIG. 4, in conjunction with FIG. 1 and FIG. 1, a preferred bend manipulation is explained. In FIG. 4, the primary subject 20B is shown as a rectangle, rather than a dinosaur, for ease of explanation. A bend in the complex shape of a dinosaur would be difficult to perceive. A bend point B1 is selected along the height of the primary subject 20B. The bend point B1 is between ⅓ and ⅔ the overall height of the primary subject 20B. The primary subject 20B is also divided into three regions 31, 33, 35 along its height. In the first region 31, the primary image 20B is not manipulated. In the second region 33, no manipulation occurs until the bend line B1. Any portion of the primary subject 20B above the bend line B1 and within the second region 33 is digitally tilted by a first angle AA1. In the third region 35, the primary subject 20B is tilted at a second angle AA2, which is steeper than the first angle AA1. The first angle AA1 and the second angle AA2 are measured in relation to an imaginary vertical plane that is parallel to the vertical plane in which the light field camera 17 is set. The result is that the imagery 10 can be made larger and taller without extending above the rear image boundary 28. When viewed from the perspective of the light field camera 17, the primary subject 20B appears taller and has a more pronounced forward or vertical projection.

Figure 5:
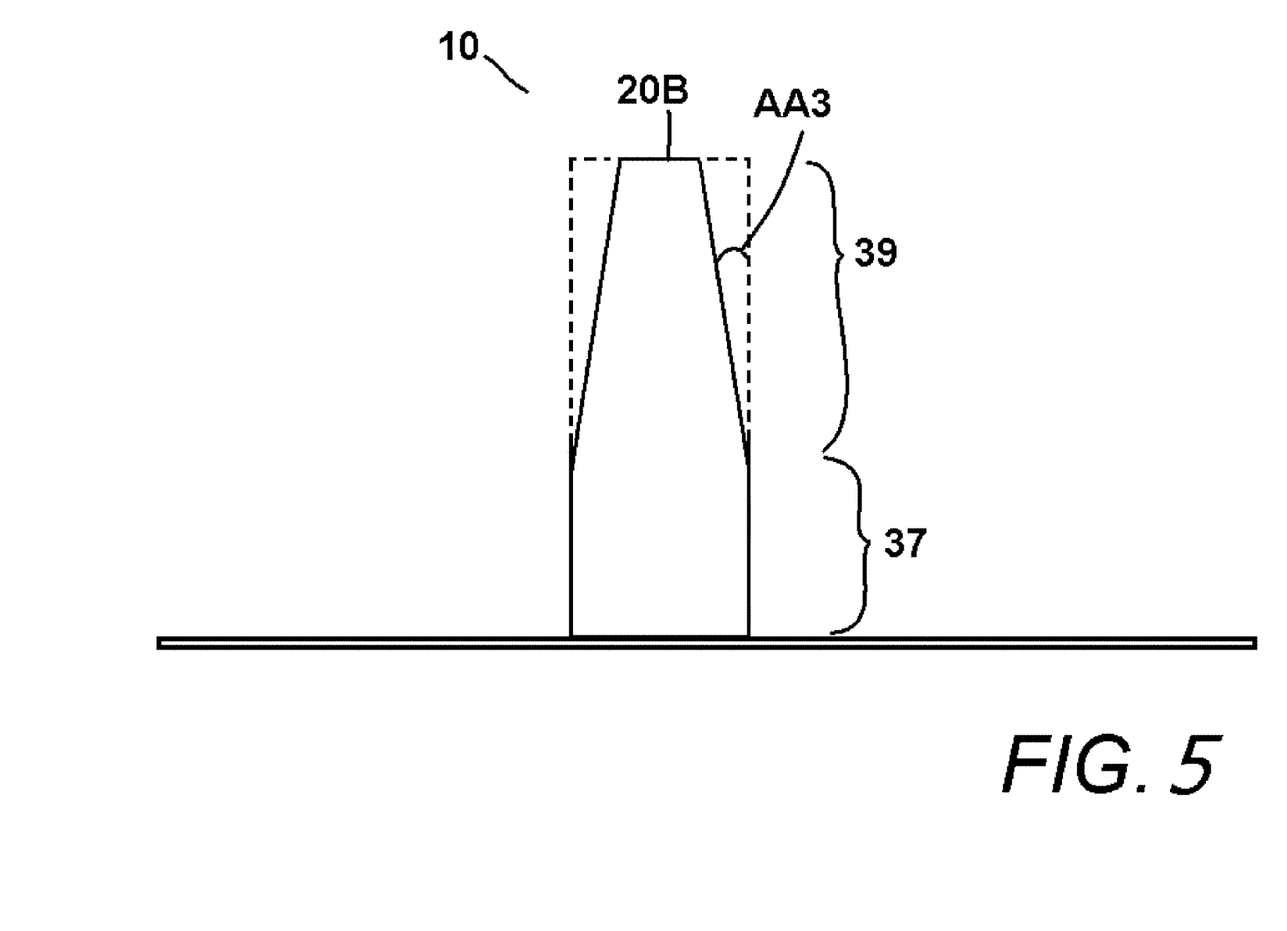
FIG. 5 is a front view showing taper digital modifications made to the data collected by imaging.

Referring to FIG. 5, in conjunction with FIG. 1 and FIG. 2, a preferred taper manipulation is explained. Again, the primary subject 20B is shown as a representative rectangle, rather than a dinosaur for ease of explanation. The primary subject 20B is divided into two regions 37, 39 along its height. In the first region 37, the primary subject 20B is not manipulated. In the second region 39, the primary subject 20B is reduced in size using a taper from front to back of an angle AA3 of between 1 degree and 25 degrees. The point where the taper begins is positioned between ⅓ and ⅔ up the height of the primary subject 20B. The result is that the imagery 10 can be made wider without extending beyond the side image boundaries 29, 30. When viewed, the primary subject 20B appears taller and has a more pronounced forward or vertical projection.

Figure 6:
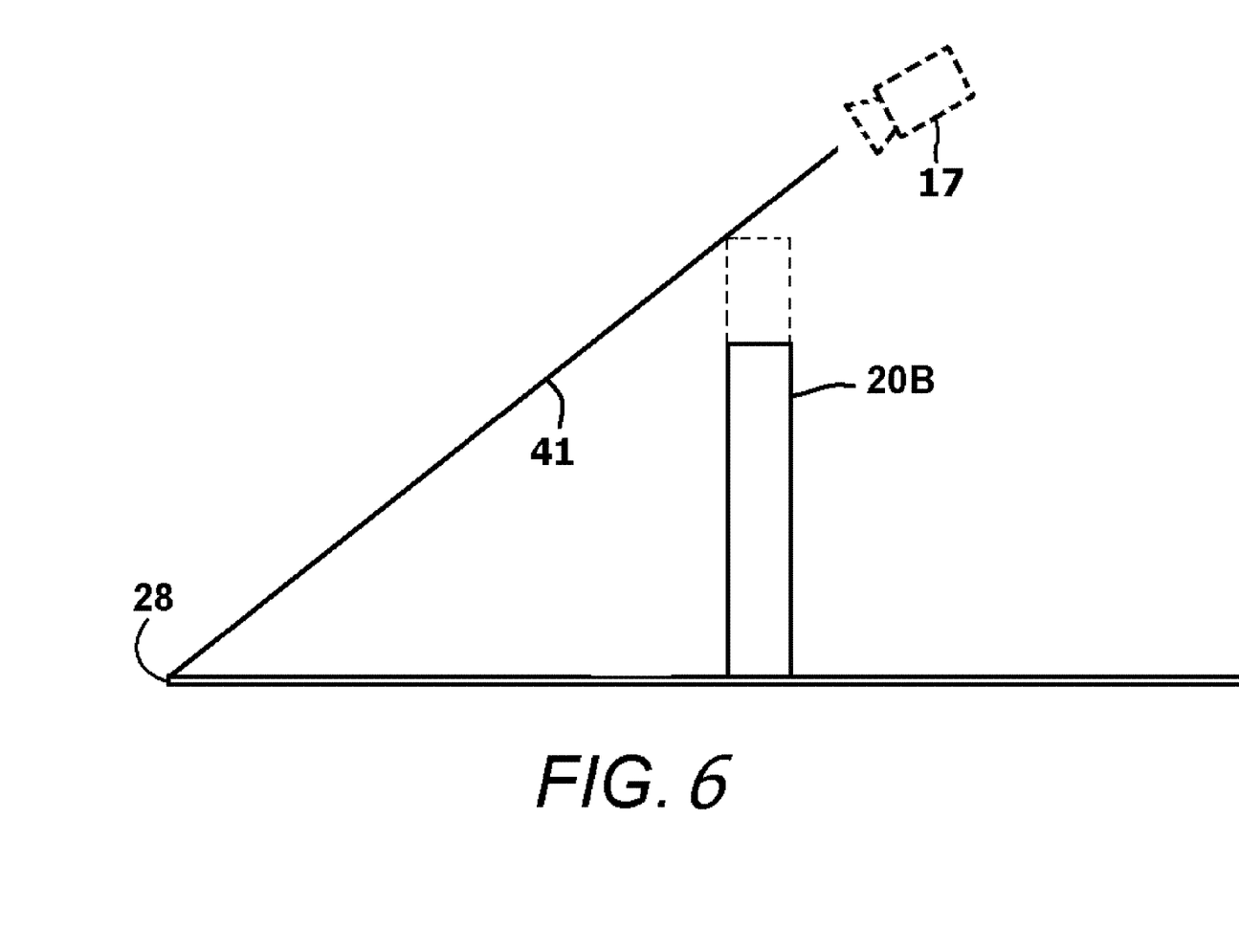
FIG. 6 is a front view showing stretch digital modifications made to the data collected by imaging.

Referring to FIG. 6 in conjunction with FIG. 1 and FIG. 2, a preferred stretch manipulation is explained. Again, the primary subject 20B is shown as a representative rectangle, rather than a dinosaur for ease of explanation. There is an imaginary line 41 that extends from the light field camera 17 to the rear boundary 28 of the light field image data 16. This imaginary line 41 represents the upper limit of what can be viewed with enhanced 3D effects. The various subjects, including the primary subject 20 have heights that may not reach the imaginary line 41. If the height of a subject, such as the primary subject 20, is below the imaginary line 41, then the height of the primary subject 20B can be stretched vertically until it approaches the height of the imaginary line 41. The result is that all or some of the imaged subjects can be made taller without extending beyond the image boundaries. When viewed, the primary subject 20B appears taller and has a more pronounced forward or vertical projection.

Once the light field image data 16 is digitally adjusted in one or more of the manners described, digitally enhanced image data 43 is created. The digitally enhanced image data 43 is used to create two offset images 40, 42. Since the digitally enhanced image data 43 is initially obtained from a light field camera 17, this data can be skewed to produce two images from two different viewpoints in the same manner as traditional light field camera data.

Figure 7:
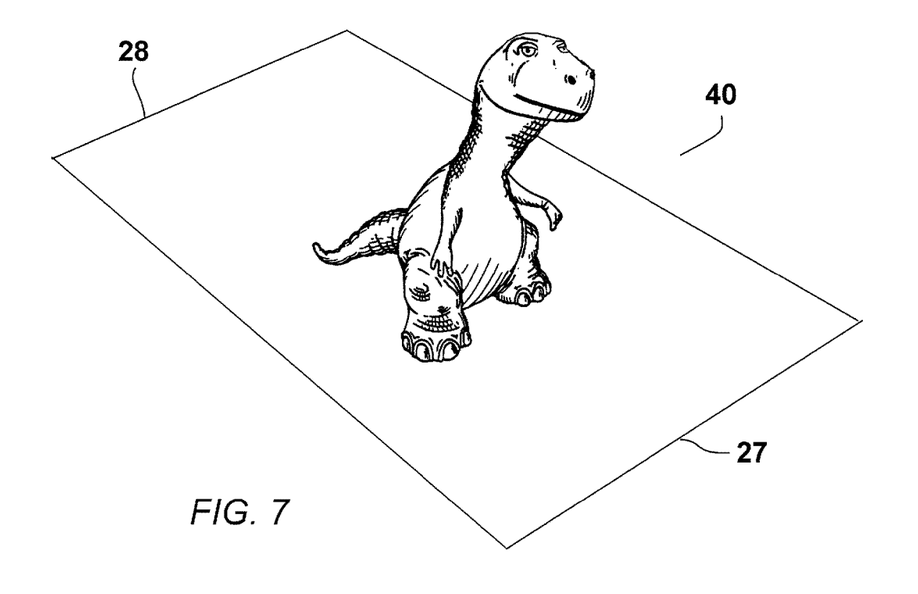
FIG. 7 and FIG. 8 show left and right offset images, respectively, of the virtual scene.
Figure 8:
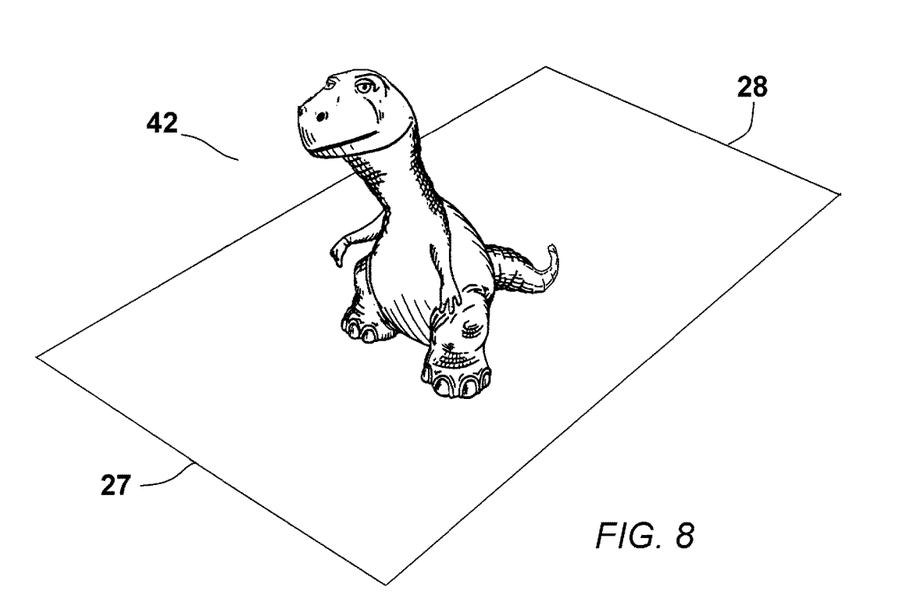

Referring to FIG. 7 and FIG. 8 in conjunction with FIG. 1 and FIG. 2, it can be seen that the two offset images 40, 42 can be considered as stereoscopic, with one being the left skewed image 40 (FIG. 7) and one being the right skewed image 42 (FIG. 8). Each offset image 40, 42 has a fading perspective due to the elevated orientation of the light field camera 17. This causes the front image boundary 27 to appear to be wider than the rear image boundary 28 in both offset images 40, 42.

Figure 9:
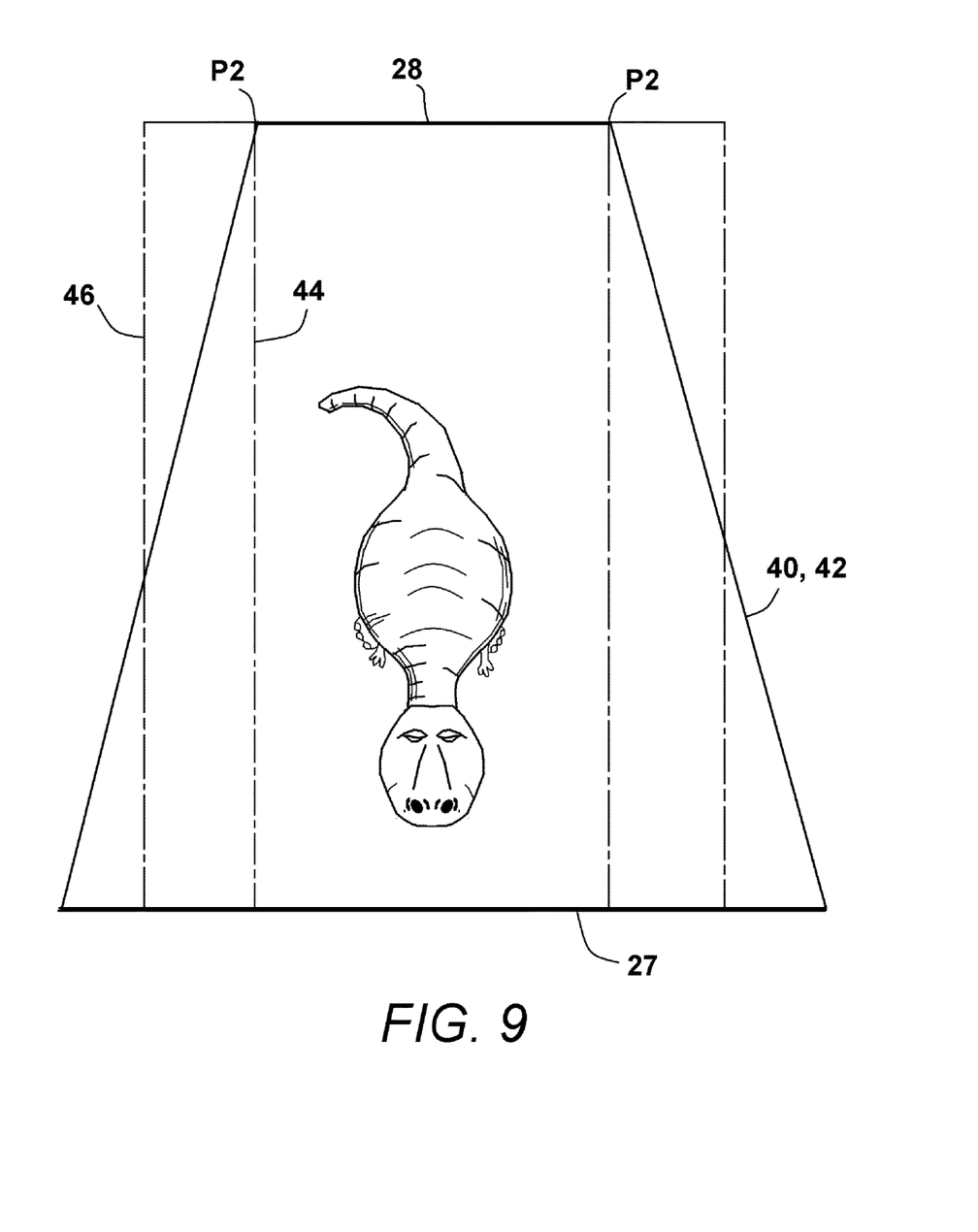
FIG. 9 is a top view of the offset images showing the superimposition of guidelines.

Referring to FIG. 9, a top view of one of the offset images 40, 42 from FIG. 7 or FIG. 8 is shown. Although only one of the offset images is shown, it will be understood that the described process is performed on both of the offset images 40, 42. Thus, the reference numbers 40, 42 of both offset images are used to indicate that the processes affect both.

Temporary reference guides are superimposed upon the stereoscopic images 40, 42. The reference guides include a set of inner guidelines 44 and a set of outer guidelines 46. The inner guidelines 44 are parallel lines that extend from the rear image boundary 28 to the front image boundary 27. The inner guidelines 44 begin at points P2 where in stereoscopic images 40, 42 met the rear boundary line 28. The outer guidelines 46 are also parallel lines that extend from the rear image boundary 28 to the front image boundary 27. The position of the outer guidelines 46 depends upon the dimensions of the electronic display 12 upon which the imagery 10 is to be displayed. The width between the outer guidelines 46 corresponds to the pixel width of the electronic display to be used.

Figure 10:
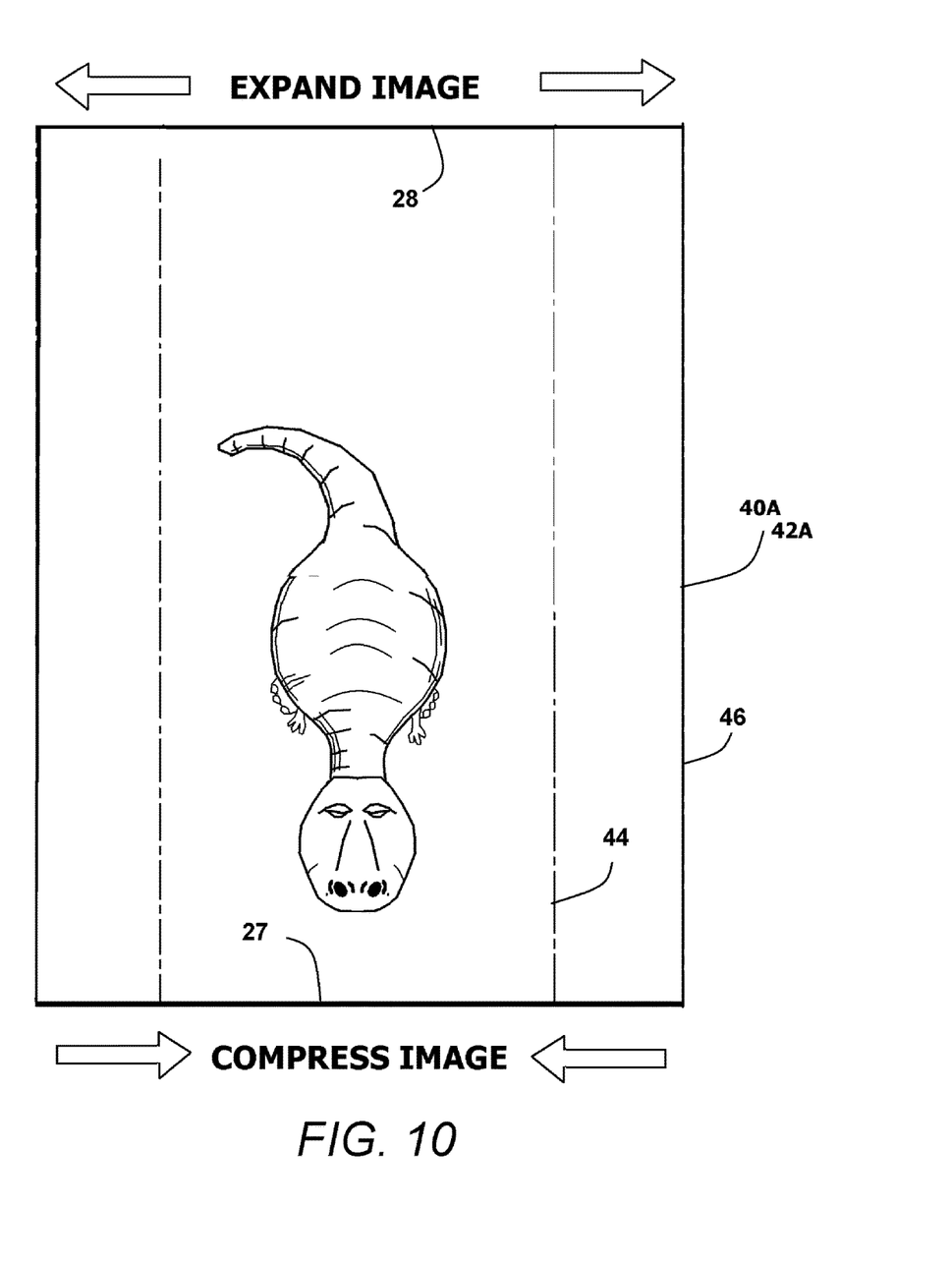
FIG. 10 shows a digitally corrected offset image created using the guidelines previously shown in FIG. 9.

Referring to FIG. 10 in conjunction with FIG. 9, it can be seen that the peripheries of the offset images 40, 42 are digitally altered to fit within the parameters of the outer guidelines 46. As such, the offset images 40, 42 are widened toward the rear image boundary 28 and compressed toward the front image boundary 27. This creates corrected offset images 40A, 42A. The inner guidelines 44 remain on the corrected offset images 40A, 42A.

Figure 11:
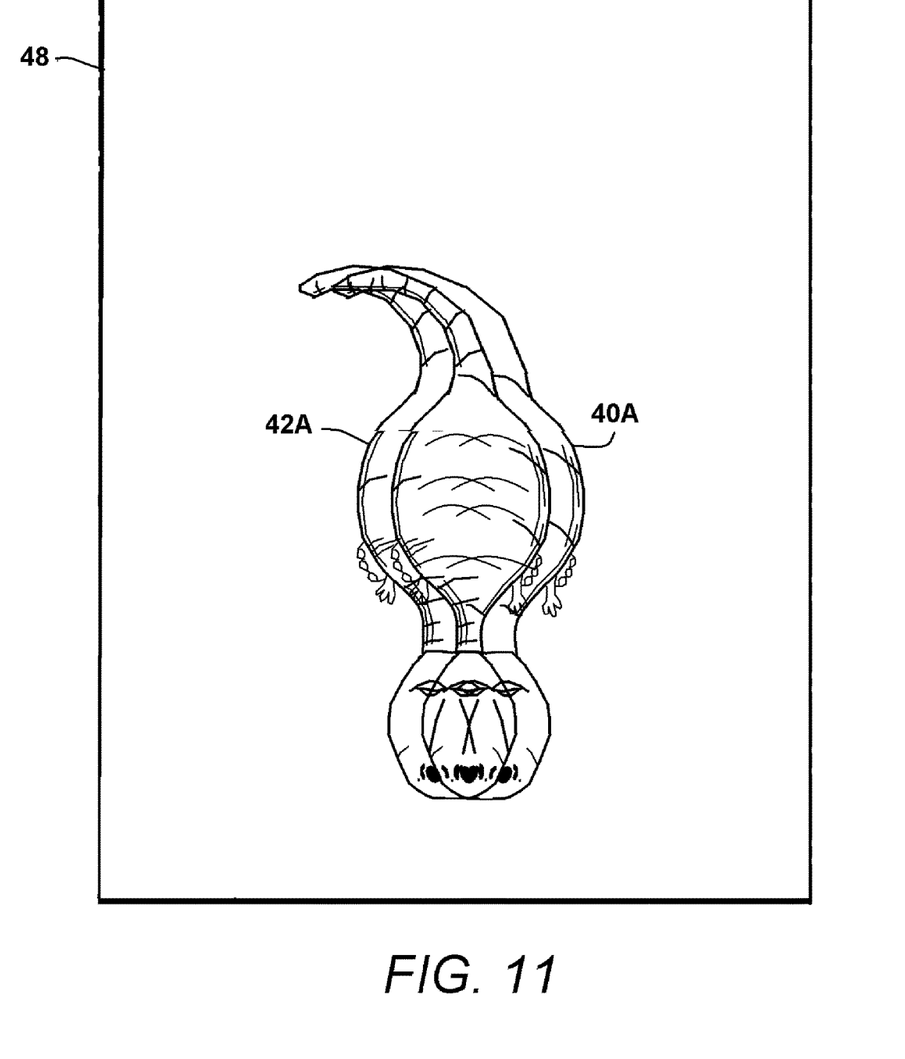
FIG. 11 shows a final imagery with left and right offset images superimposed.

Referring to FIG. 11, in conjunction with FIG. 10, the corrected left and right offset images 40A, 42A are superimposed. The inner guidelines 44 from both corrected offset images 40A, 42A are aligned. Once alignment is achieved, the inner guidelines 44 are removed. This creates the final imagery 10. Depending upon how the final imagery 48 is to be viewed, the corrected offset images 40A, 42A can be colored in red or cyan. Alternatively, the offset images 40A, 42A can be can be oppositely polarized or set into a side-by-side format. In this manner, when the final imagery 10 is viewed using 3D glasses or is viewed on an autostereoscopic display, the final imagery 48 will appear to be three-dimensional.

Figure 12:
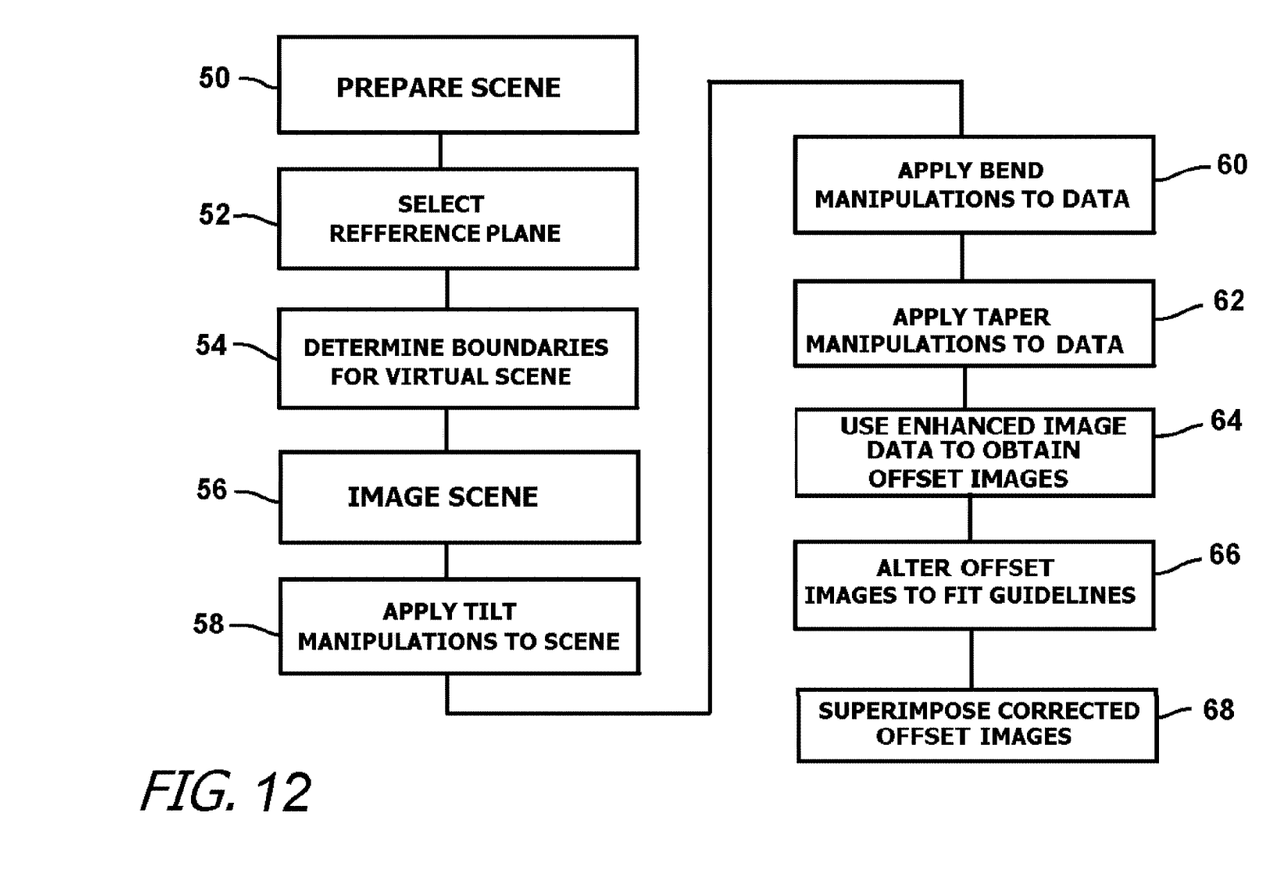
FIG. 12 shows a block diagram logic flow for the software methodology utilized by the present invention.

Referring to FIG. 12 in view of all earlier figures, the software methodology for the overall system can now be summarized. As is indicated in Block 50, a content producer uses a light field camera 17 to image one or more subjects 20 that are to appear having enhanced 3D effects. See prior description of FIG. 1 and FIG. 2. The content producer also selects a reference plane 24 for the light field image data produced by the light field camera. See Block 52. Using the reference plane 16 and the selected subjects 20, the content producer can determine the boundaries of the image field to be used by the final imagery 10. See Block 54.

Knowing the boundaries of the image field, the reference plane 24, and the position of the light field camera 17. The light field image data 16 collected by the light field camera 17 can be enhanced using the image editing software 18. As is indicated by Blocks 58, 60, 61 and 62, the light field image data 16 is digitally altered using tilt manipulations, bend manipulations, taper manipulations and stretch manipulations. See prior description of FIG. 3, FIG. 4. FIG. 5. and FIG. 6. This produces enhanced image data 43. The enhanced image data 43 is then utilized to create two offset images 40, 42. See Block 64. Also see prior description of FIG. 7 and FIG. 8. The offset images 40, 42 are then corrected to fit the boarder guidelines. See Block 66. Also see prior description of FIG. 9 and FIG. 10. Lastly, the corrected offset images are superimposed. See Block 68. Also see prior description of FIG. 11. The result is final imagery 10 having enhanced 3D effects that appear to extend above, or in front of, the display 12 when viewed by a user.

It will be understood that the embodiment of the present invention that is illustrated and described is merely exemplary and that a person skilled in the art can make many variations to that embodiment. All such embodiments are intended to be included within the scope of the present invention as defined by the appended claims.

What is claimed is:

1. A method of producing imagery to be viewed on a display medium, wherein said imagery has enhanced 3D effects that appear to extend out of said display medium when viewed, said method comprising the steps of:
   imaging a scene with a light field camera, wherein said scene contains a subject at an initial orientation, and wherein said light field camera produces light field image data;
   selecting a reference plane within said scene imaged by said light field camera, wherein said reference plane has peripheral boundaries that include a front boundary, a rear boundary, and side boundaries; and
   altering said light field image data in said scene to add enhanced 3D effects by digitally tilting said reference plane about a fulcrum point on said reference plane under said subject, therein creating enhanced image data, wherein said enhanced 3D effects cause said subject to appear, at least in part, to extend out of said display medium when viewed.

2. The method according to claim 1, wherein altering said light field image data includes altering said light field image data by digitally tilting said subject at an angle of inclination relative said reference plane.

3. The method according to claim 1, wherein altering said light field image data includes digitally bending at least part of said subject out of said initial orientation.

4. The method according to claim 3, wherein digitally bending at least part of said subject includes digitally bending said subject only above a first bend point, wherein said first bend point is at a first elevation above said reference plane.

5. The method according to claim 4, wherein said subject has a perceived height and said first elevation of said first bend point is between ⅓ and ⅔ of said perceived height.

6. The method according to claim 1, wherein altering said light field image data includes digitally tapering at least part of said subject so that said subject appears tapered with respect to said initial orientation.

7. The method according to claim 1, wherein altering said light field image data includes digitally elongating at least part of said subject so that said subject appears elongated relative said initial orientation.

8. The method according to claim 1, further including the step of creating two offset images of said scene from said enhanced image data.

9. The method according to claim 8, further including the step of superimposing said offset images to form superimposed offset images.

10. The method according to claim 1, wherein said display medium is an electronic display with a screen plane and said imagery is displayed with said reference plane oriented in said screen plane.

11. The method according to claim 1, wherein said display medium is a print and said imagery is displayed with said common set of boundaries oriented in a common plane with said print.

12. A method of producing imagery to be viewed on a display, wherein said imagery has enhanced 3D effects that cause aspects of said imagery to appear to extend out of said display when viewed, said method comprising the steps of:
   imaging a scene with a camera, wherein said scene contains a subject at an initial orientation, and wherein said camera produces digital data indicative of said scene;
   selecting a reference plane within said scene imaged;
   editing said digital data to add enhanced 3D effects to at least part of said subject by digitally bending said subject in said scene beginning at a first bend point at a first elevation above said reference plane, therein creating enhanced image data, wherein said enhanced 3D effects cause said subject to appear, at least in part, to extend out of said display when viewed.

13. The method according to claim 12, wherein said camera is a light field camera.

14. The method according to claim 12, wherein editing said digital data includes altering said digital data by digitally tilting at least part of said subject at an angle of inclination relative said reference plane.

15. The method according to claim 12, wherein editing said digital data includes altering said digital data by tapering at least part of said subject so that said subject appears tapered with respect to said initial orientation.

16. The method according to claim 12, wherein editing said digital data includes altering said digital data by digitally elongating at least part of said subject so that said subject appears elongated relative said initial orientation.

17. The method according to claim 12, wherein editing said digital data includes altering said digital data by digitally tilting said reference plane at an angle of inclination.

18. A method of producing imagery to be viewed on a display medium, wherein said imagery has enhanced 3D effects that appear to extend out of said display medium when viewed, said method comprising the steps of:
   imaging a scene with a light field camera, wherein said scene contains a subject at an initial orientation that has a perceived height when viewed on said display medium, and wherein said light field camera produces light field image data;
   selecting a reference plane within said scene imaged by said light field camera; and
   altering said light field image data in said scene to add enhanced 3D effects by digitally bending at least part of said subject above a first bend point, wherein said first bend point is at a first elevation above said reference plane that is between ⅓ and ⅔ of said perceived height, therein creating enhanced image data, wherein said enhanced 3D effects cause said subject to appear, at least in part, to extend out of said display medium when viewed.

* * * * *